United States Patent [19]

McCanny et al.

[11] Patent Number: 4,686,645

[45] Date of Patent: Aug. 11, 1987

[54] PIPELINED SYSTOLIC ARRAY FOR MATRIX-MATRIX MULTIPLICATION

[75] Inventors: John V. McCanny; John G. McWhirter, both of Malvern; Kenneth W. Wood, Newcastle-upon-Tyne, all of England

[73] Assignee: National Research Development Corporation, London, England

[21] Appl. No.: 639,423

[22] Filed: Aug. 10, 1984

[30] Foreign Application Priority Data

Jul. 28, 1983 [GB] United Kingdom ............... 8320362

[51] Int. Cl.[4] .............................................. G06F 7/52
[52] U.S. Cl. .................................... 364/754; 364/757
[58] Field of Search ............... 364/754, 755, 757, 758, 364/759, 760, 749, 713

[56] References Cited

U.S. PATENT DOCUMENTS

| 4,493,048 | 1/1985 | Kung et al. | 364/754 |
| 4,507,748 | 3/1985 | Cotton | 364/749 |
| 4,533,993 | 8/1985 | McCanny et al. | 364/200 |
| 4,592,004 | 5/1986 | Bocker et al. | 364/713 |
| 4,639,857 | 1/1987 | McCanny et al. | 364/754 |

FOREIGN PATENT DOCUMENTS

| 2563349 | 10/1985 | France | 364/754 |
| 1278102 | 6/1972 | United Kingdom . | |

OTHER PUBLICATIONS

*Effective Pipelining of Digital Systems,* by Jump et al., IEEE Transactions on Computers, vol. C-27, No. 9, Sep. 1978, pp. 855-865.
Mead et al., Introduction to VLSI Systems, Oct. 1980, pp. 276-280.
Kung, "*Why Systolic Architectures?*", Computer, vol. 15, No. 1, Jan. 82, pp. 37-46, IEEE, Long Beach, CA.
McCanny et al., "*Bit-Level Systolic Array Circuit for Matrix Vector Multiplication*", IEEE Proceedings, vol. 130, part G, No. 4, Aug. 1983, pp. 125-130.
Foster et al., "*The Design of Special-Purpose VLSI Chips*", Computer, vol. 13, No. 1, Jan. 1980, IEEE Long Beach, CA, pp. 26-40.
Thompson et al., "*Digital Arithmetic Units for a High Data Rate*", The Radio and Electronic Engineer, vol. 45, No. 3, Mar. 1975, pp. 116-120, London, GB.
Hallin et al., "*Pipelining of Arithmetic Functions*", IEEE Transactions on Computers, vol. 21, No. 8, Aug. 1972, pp. 880-886, IEEE, New York, U.S.A.
Kung et al., "*Matrix Triangularisation by Systolic Arrays*", SPIE, vol. 298, Real Time Signal Processing, 4 (1981), pp. 19-26.

*Primary Examiner*—Archie E. Williams, Jr.
*Assistant Examiner*—Long Nguyen
*Attorney, Agent, or Firm*—Cushman, Darby & Cushman

[57] ABSTRACT

A digital data processor for matrix/matrix multiplication includes a systolic array of nearest neighbor connected gated full adders. The adders are arranged to multiply two input data bits and to add their product to an input cumulative sum bit and a carry bit from a lower order bit computation. The result and input data bits are output to respective neighboring cells, a new carry bit being recirculated for later addition to a higher order bit computation. Column elements of one matrix and row elements of the other are input to either side of the array bit-serially, least significant bit leading, for mutual counterpropagation therethrough with a cumulative time delay between input of adjacent columns or rows. Bit-level matrix interactions for product matrix computation occur at individual cells. Pairs of intercalated adder trees are connected switchably to the array to accumulate bit-level contributions to product matrix elements.

9 Claims, 14 Drawing Figures $c \longleftarrow c^1 \oplus (a.b) \oplus cy^1$
$cy \longleftarrow (a.b).c^1 + (a.b).cy^1 + c^1.cy^1$ $c \longleftarrow c^1 \oplus (ctrl \oplus a.b) \oplus cy^1$
$cy \longleftarrow (ctrl \oplus a.b).c^1 + (ctrl \oplus a.b).cy^1 + c^1.cy^1$ $$s \leftarrow p^I \oplus q^I \oplus cy^I$$
$$C_y \leftarrow p^I \cdot q^I + p^I \cdot cy^I + q^I \cdot cy^I$$

PIPELINED SYSTOLIC ARRAY FOR MATRIX-MATRIX MULTIPLICATION

This invention relates to a digital data processor for matrix-matrix multiplication, and more particularly to such a processor incorporating a pipelined systolic array.

Systolic arrays of processing cells are known as a means of executing computations, as set out for example by Kung and Gentleman in "Matrix Triangularisation by Systolic Arrays", SPIE Vol 298, Real Time Signal Processing 4 (1981) pp 19–26. Such arrays are controlled solely by external clocking means which "pump" array operation in the manner of a heart beating, hence the term systolic. Data processing carried out by the array depends on individual cell functions and intercell connections, rather than on a stored computer programme.

Systolic arrays are highly suited to pipelined operations. A sequence of operations is said to be pipelined if a data element can enter the sequence before a preceding element has left it. Pipelining allows reduction in the number of devices which are temporarily idle.

Pipelined systolic arrays employing complex individual processing cells are known. The Kung and Gentleman array (ibid) for example would require individual word-level cells such as microprocessors. More recently, U.S. Pat. No. 4,639,857 to McCanney et al describes arrays in which individual cells operate on single data bits, providing bit-level systolic arrays. Inter alia, that application describes bit-level arrays for multiplication of (1) two numbers, (2) two vectors and (3) a matrix and a vector. Bit-level arrays are highly suitable for implementation as very large scale integrated (VLSI) circuits, unlike arrays of more complex processing cells.

It is an object of the invention to provide a means for multiplying together two matrices.

The present invention provides a digital data processor for multiplying row elements of a first input matrix by column elements of a second input matrix to form a product matrix, the processor including:
- a systolic array of processing cells arranged for bit-level multiplication;
- data input means arranged to effect bit-level matrix element input to the array for multiplication of each bit of each first matrix row element by each bit of each of the second matrix elements in a respective column;
- accumulating means arranged to sum array output contributions to each bit of each product matrix element; and
- clocking means to control operation of the processing cells, data input means and accumulating means.

The invention provides a means for matrix/matrix multiplication which is particularly convenient to implement by VLSI techniques. The data input means may be arranged for matrix element input bit-serially with least significant bits leading.

The processor of the invention may incorporate processing cells which are nearest-neighbour connected and have processing functions to evaluate the product of two input data bits, add the product to an input cumulative sum bit and a carry bit from a next lower order bit computation, output a corresponding result, generate a new carry bit and pass on the input data bits to respective neighbouring cells.

The data input means may be arranged to input the matrices with zeros interspersed between adjacent bits of each matrix element. The clocking means is then arranged to advance each input matrix one processing cell through the array after each processing cell operation, and a cumulative time stagger is applied between adjacent rows or columns as appropriate of the input matrices.

The data input means may alternatively be arranged to input matrix element bits without interspersed zeros. The clocking means is then arranged to advance both adjacent columns of one matrix and adjacent rows of the other on alternate processing cycles such that each advanced column or row interacts with a respective stationary row or column. Alternate columns or rows of the matrices as appropriate are input with a cumulative time stagger therebetween.

The accumulating means preferably includes pairs of mutally intercalated adder trees for summing bit-level product matrix elements, bit-level array output contributions being switchably connected to one or other of two respective adders in different trees. The accumulating means may also include means for switching cell output between adder trees in synchronism with the entry of a leading bit of an input matrix element to that cell. The switching means may include two control lines each containing a respective series of latches with one respective latch for each output cell, means for generating pulses to propagate along the control lines in synchronism with leading matrix element bits, and a respective switching circuit for switching each output cell between adder trees when either but not both respective latches receive a pulse.

In order that the invention might be more fully understood, embodiments thereof will now be described with reference to the accompanying drawings, in which.

Figure 1:
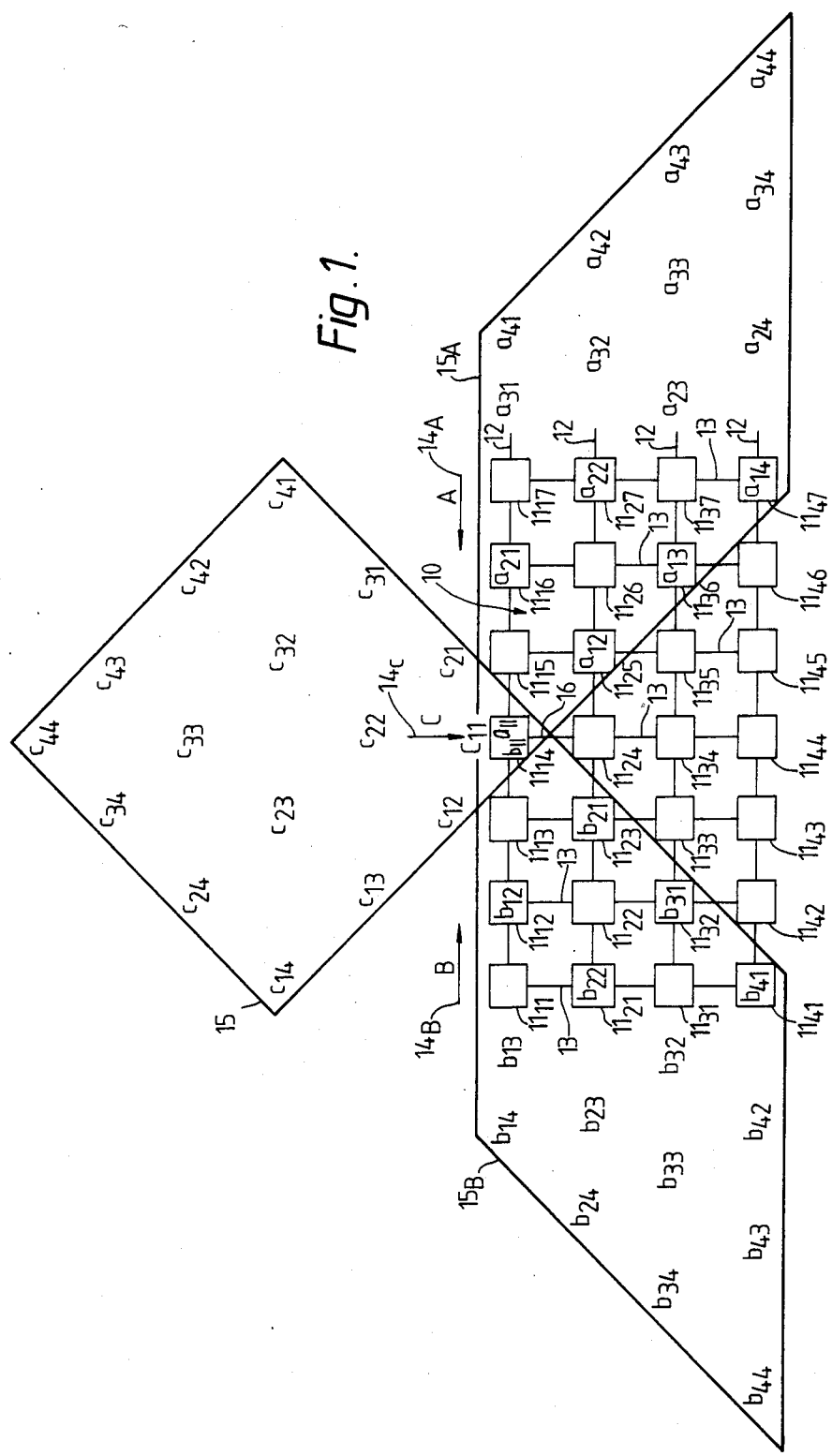
FIG. 1 is a schematic drawing of a word-level systolic array for multiplying two matrices.

Referring to FIG. 1, a 4×7 systolic array indicated generally by 10 comprises individual word-level processing cells indicated by squares $11_{ij}$ arranged in rows 12 and columns 13. The suffixes i and j indicate row and column positions. Cell interconnections are not shown. Two 4×4 input matrices A and B having respective coefficients $a_{ik}$ and $b_{kj}$ mutually counter-propagate across the array 10 in the direction of arrows $14_A$ and $14_B$. Each column of A ($a_{1m}$ to $a_{4m}$) and each corresponding row of B ($b_{m1}$ to $b_{m4}$) move in the same respective row 12 of cells 11. Each cell 11 is a word-level multiplier/accumulator arranged to multiply together column elements of A and row elements of B to form elements $c_{ij}$ of a product matrix C given by $$c_{ij} = \sum_{k=1}^{m} a_{ik} b_{kj} \qquad (1)$$

Word-level elements $a_{ik}$ and $b_{kj}$ are input to each cell from the right and left respectively, together with a cumulative product from the respective cell above. On each processing cycle, each cell forms a partial product $a_{ik} b_{kj}$, adds it to the input cumulative product and outputs the result to the cell below. Elements $a_{ik}$ and $b_{kj}$ are then passed on respectively to left and right hand neighbouring cells. Individual elements of each column of A and corresponding row of B move in a respective row 12 meeting each other at cells 11 such that each column element of A multiplies each element in a corresponding row of B. The sum of product terms provides a respective element of the matrix C as indicated by Equation (1). To ensure that all elements meet correctly for multiplication, columns of A and rows of B are each input with zeros interspersed between elements and with a respective one cell cumulative time stagger between data in successive rows 12. Because of the time stagger, the arrays of data in the matrices A and B can be considered as leftward and rightward leaning parallelograms as indicated at $15_A$ and $15_B$.

The product matrix C can be said to occupy a diamond shaped region $15_C$ which moves as indicated by arrow $14_C$ down into the array 10 as A and B move through one another. It will be appreciated that the regions of the parallelograms $15_A$ and $15_B$ and diamond $15_C$ outside the array 10 have no physical significance, but are an aid in understanding data propagation, interaction and product formation. As shown in FIG. 1, the lowest vertex 16 of the diamond $15_C$ has just entered the uppermost row 12 of the array 10, and encompasses a cell $11_{14}$ where matrix elements $a_{11}$ and $b_{11}$ have met to form part of a product element $c_{11}$. The partial contribution to element $c_{11}$ is output downwards. On the next processing cycle, A and B or parallelograms $15_A$ and $15_B$ will have moved on by one processing cell in the directions of arrows $14_A$ and $14_B$ respectively. The interaction region or diamond $15_C$ accordingly moves down one array row 12, so that vertex 16 accommodates cells $11_{24}$, $11_{13}$ and $11_{15}$. The movement of A and B brings elements $b_{21}$ and $a_{12}$ together for multiplication at cell $11_{24}$ and addition to the product term calculated by cell $11_{14}$. As parallelograms $15_A$ and $15_B$ move through each other, diamond $15_C$ moves down through the array, and element $c_{11}$ of C collects all four inner product terms of the kind $a_{1k}b_{k1}$ which it includes. The element $c_{11}$ is then given by the output of cell $11_{44}$. Subsequently, elements $c_{22}$, $c_{33}$ and $c_{44}$ emerge from cell $11_{44}$. In a similar fashion, other elements $c_{ij}$ ($i \neq j$) appear at the outputs of cells 11 in the fourth row having collected all corresponding inner product terms $a_{ik}b_{kj}$.

Figure 2:
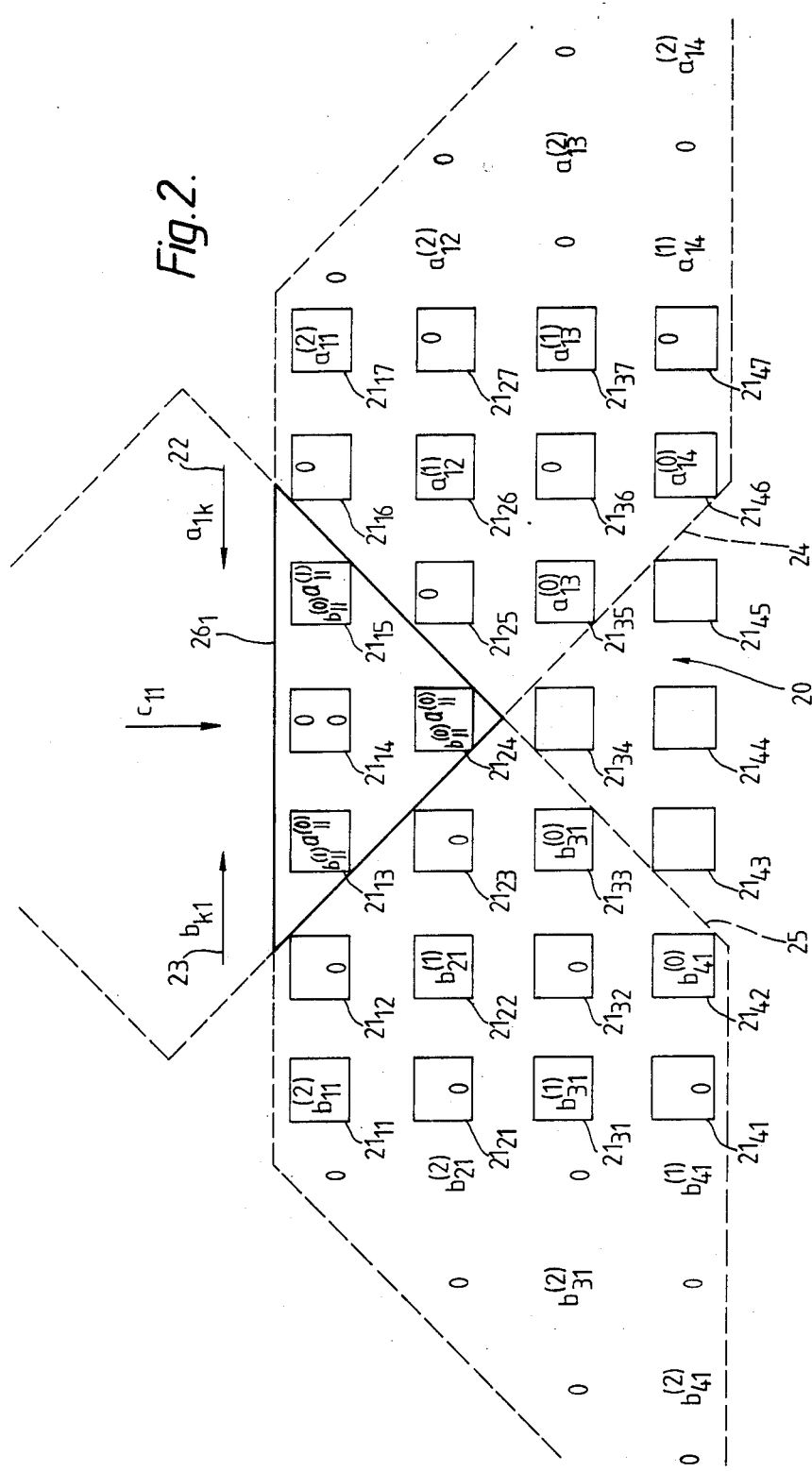
FIGS. 2 to 4 are schematic drawings of a part of a bit-level systolic array for a digital data processor of the invention, and illustrate three successive processing cycles.
Figure 3:
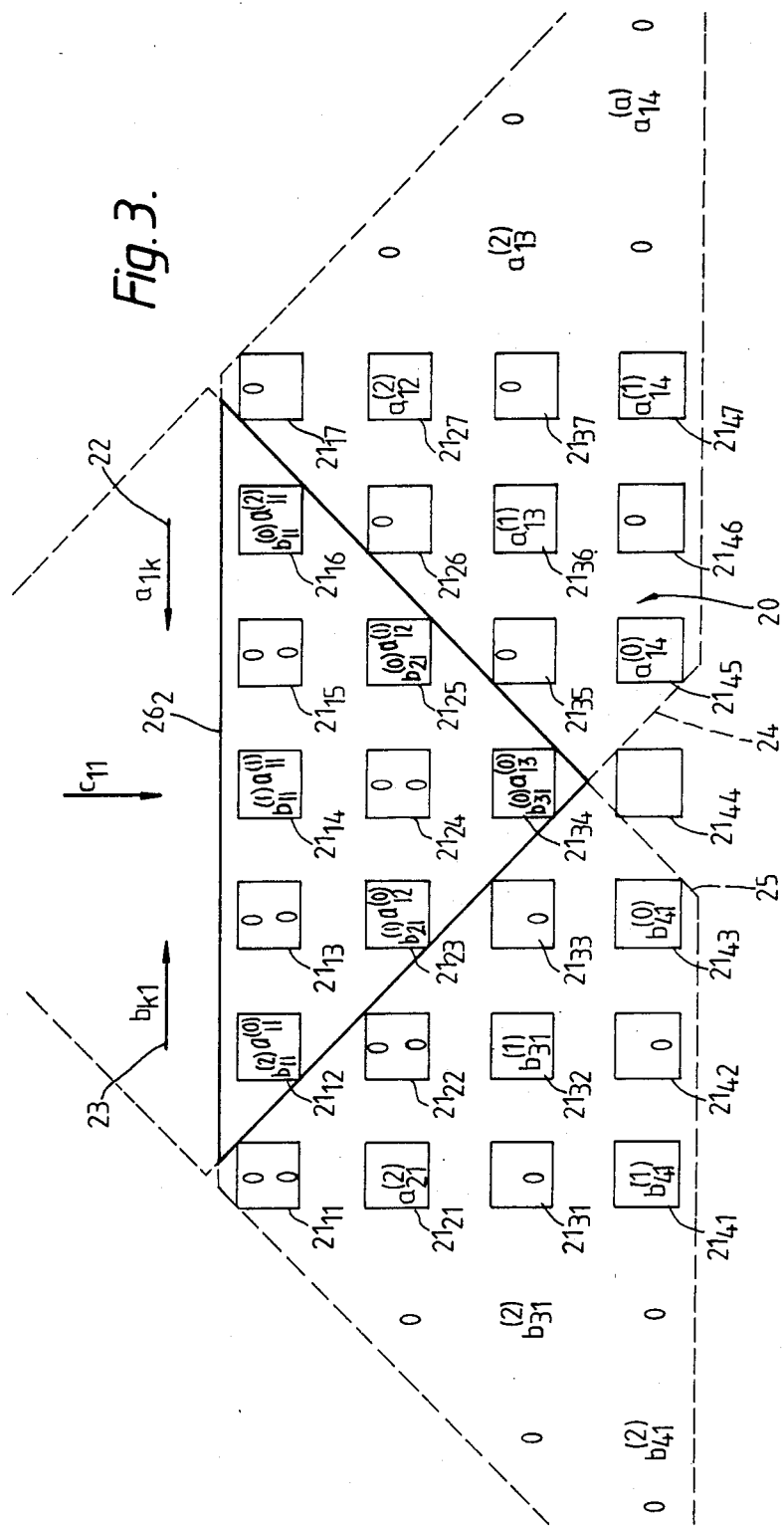
Figure 4:
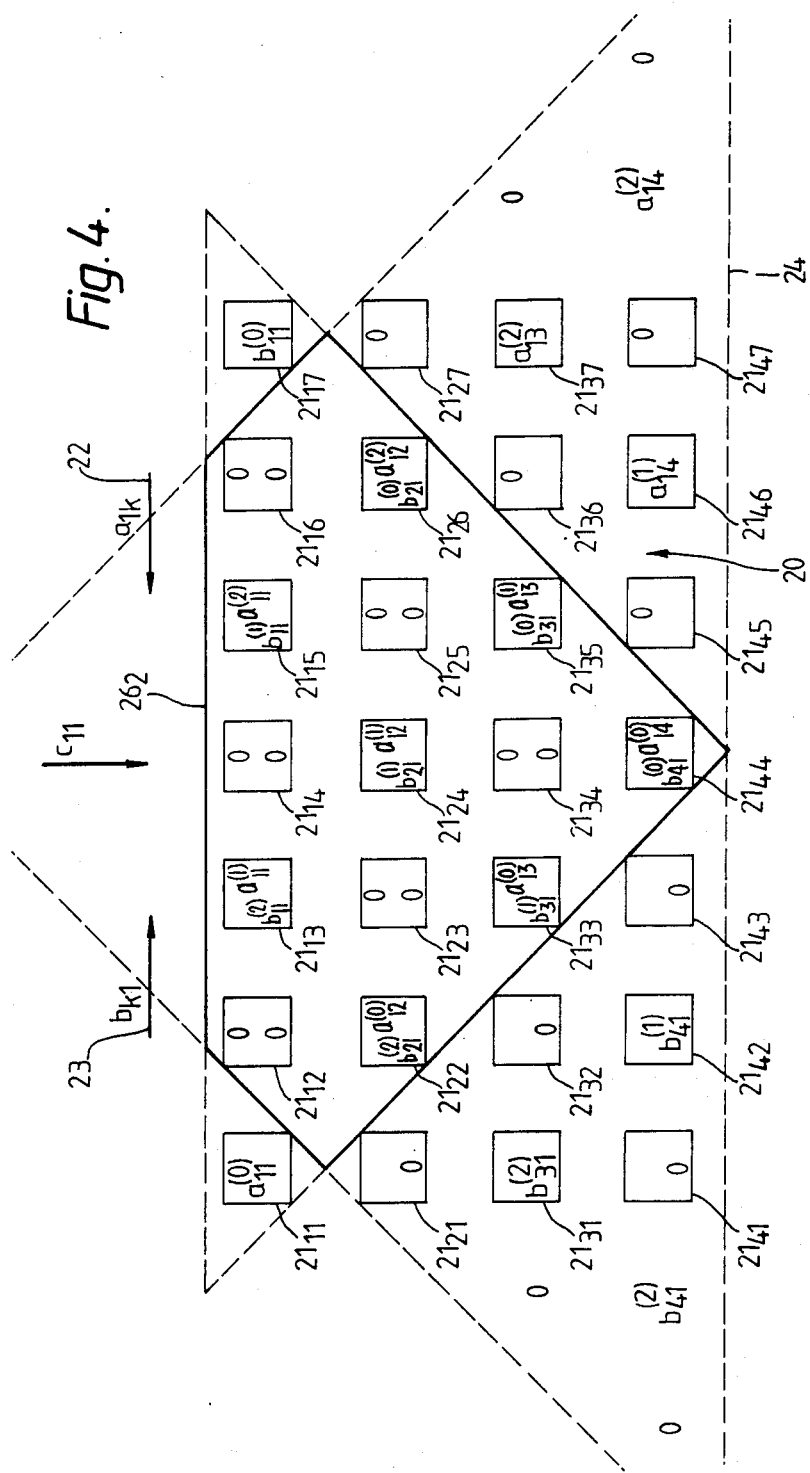

Reference is now made to FIGS. 2, 3 and 4, in which like parts have like references. These drawings show a small part 20 of a bit-level systolic array (not shown in full) on three successive array processing cycles, and illustrate bit-level implementation of the FIG. 1 word-level arrangement. The array 20 has bit-level processing cells 21 having suffixes, i.e. $21_{ij}$, indicating row and column positions respectively. The cells 21 are one-bit gated full adders with nearest neighbour interconnections (not shown) as will be illustrated in detail later. Each cell 21 receives input matrix element data bits from its left and right hand nearest neighbour cells together with a cumulative product bit from its upper nearest neighbour. It multiplies together the matrix element data bits, adds the cumulative product thereto and outputs the result to its lower nearest neighbour. Data bits previously received from the left and right are passed on to neighbouring cells to the right and left respectively. This takes place on each processing cycle under the control of clocking means.

Two $4 \times 4$ matrices A and B having three-bit elements $a_{ik}$ and $b_{kj}$ are input to the array 20 with the respective least significant bit (lsb) leading. The most significant bit (msb) may be a sign bit, and bit significance is indicated by superscript parenthesis (n), where n=0, 1 or 2 in ascending order of significance. Individual bits are input to each row of the array 20 interspersed with zeros, and a one cell progressive time delay or stagger is introduced between the bits input to adjoining rows, the stagger being cumulative down the array 20. To muliply two matrices, the rows of one matrix must interact with the columns of the other. Moreover, to multiply two bit-level words, each bit of one word must multiply each bit of the other. To implement this, the elements in the first column of A, i.e. $a_{11}^{(n)}$ to $a_{41}^{(n)}$ (n=0, 1 or 2), are input bit serially, lsb leading and sequentially into the uppermost row (cells $21_{11}$ to $21_{17}$) of the array 20, only $a_{11}^{(n)}$ being shown. Similarly, elements $a_{12}$ to $a_{42}$, $a_{13}$ to $a_{43}$ and $a_{14}$ to $a_{44}$ in the second, third and fourth columns of A are input to the second, third and lowest rows of the array 20, only elements $a_{12}$, $a_{13}$ and $a_{14}$ being shown. The bit-level elements of A, $a_{ik}^{(n)}$, move one cell to the left on each processing cycle as indicated by arrow 22.

Similarly, elements in the first row of matrix B, $b_{11}^{(n)}$ to $b_{14}^{(n)}$ are input to the uppermost row (cells $21_{11}$ to $21_{17}$) of the array 20, only $b_{11}^{(n)}$ being illustrated. Moreover, elements $b_{21}$ to $b_{24}$, $b_{31}$ to $b_{34}$ and $b_{41}$ to $b_{44}$ are input to the other three rows of the array 20, only $b_{21}$, $b_{31}$ and $b_{41}$ being shown. The one-cell progressive time stagger between data input to adjacent rows is retained. The bit-level elements of B, $b_{kj}^{(n)}$, move one cell to the right each processing cycle as indicated by arrow 23.

By virtue of the time stagger, the A and B matrix element bits illustrated, $a_{1k}^{(n)}$ and $b_{k1}^{(n)}$ (n=0 to 2, k=1 to 4), occupy respective leftward and rightward leaning parallelograms 24 and 25 which overlap in part-diamond shaped interaction regions $26_1$, $26_2$ and $26_3$ in FIGS. 2, 3 and 4 respectively.

FIGS. 2 to 4 show bit-level interactions forming $c_{11}$. More generally, product terms $c_{ij}$ are formed as follows. The rth bit of $c_{ij}$ is given by:

$$c_{ij}^{(r)} = \sum_{n=0}^{r} \sum_{k=1}^{m} a_{ik}^{(n)} b_{kj}^{(r-n)} + \text{carry bit accumulated from lower order bit-level summations} \qquad (2)$$

where n=0, 1 or 2 for three bit words and m=4 for $4 \times 4$ matrices A and B.

The time stagger applied across the array 20 to input matrix elements may be achieved by the use of latches (not shown) in series with the rows of cells. In FIG. 2, matrix elements $b_{41}$ and $a_{14}$ would be input to cells $21_{41}$ and $21_{47}$ respectively via a respective delay line of three latches. Similarly, cells $21_{31}/21_{37}$ and $21_{21}/21_{27}$ would be in series with two latches and one latch respectively.

FIGS. 2, 3 and 4 exemplify the double summation of Equation (2). In FIG. 2, in the interaction region 26, cells $21_{13}$, $21_{15}$ and $21_{24}$ are evaluating $a_{11}^{(0)}b_{11}^{(1)}$, $a_{11}^{(1)}b_{11}^{(0)}$ and $a_{12}^{(0)}21^{(0)}$. Moreover, cell $21_{24}$ adds $a_{11}^{(0)}b_{11}^{(0)}$ (received from vertically above) to its evaluated product. On the next processing cycle shown in FIG. 3, the cells each output their products to the respective cell vertically below, and the A and B parallelograms 24 and 25 move on one cell 21 to the left and to the right respectively. Consequently, the interaction region 26 moves down one cell 21 to become region $26_2$. Cells $21_{23}$, $21_{25}$ and $21_{34}$ are now evaluating the products $a_{12}^{(0)}b_{21}^{(1)}$, $a_{12}^{(1)}b_{21}^{(0)}$ and $a_{13}^{(0)}b_{31}^{(0)}$, and each adds its product to the respective previously evaluated product it received from vertically above. As before, each cell 21 outputs its sum of products to the respective cell vertically below. On the next processing cycle shown in FIG. 4, parallelograms 24 and 25 move a further cell 21 to the left and right respectively, and interaction region 26 moves down one cell to become region $26_3$. The outputs of cells $21_{33}$, $21_{35}$ and $21_{44}$ are the products $a_{13}^{(0)}b_{31}^{(1)}$, $a_{13}^{(1)}b_{31}^{(0)}$ and $a_{14}^{(0)}b_{41}^{(0)}$ respectively together with the corresponding cumulative procuct sum received from vertically above in each case. On the next cycle (not shown), the output of cell $21_{44}$ passes to accumulating means (not shown) connected to cells $21_{41}$ to $21_{47}$ in the lowermost row of the array 20 and cells $21_{43}$ and $21_{45}$ evaluate $a_{14}^{(0)}b_{41}^{(1)}$ and $a_{14}^{(1)}b_{41}^{(0)}$ respectively. The accumulating means accordingly receives the following outputs:

Cell $21_{43}$:
$$a_{11}^{(0)}b_{11}^{(1)} + a_{12}^{(0)}b_{21}^{(1)} + a_{13}^{(0)}b_{31}^{(1)} + a_{14}^{(0)}b_{41}^{(1)} \quad (3.1)$$

Cell $21_{45}$:
$$a_{11}^{(1)}b_{11}^{(0)} + a_{12}^{(1)}b_{21}^{(0)} + a_{13}^{(1)}b_{31}^{(0)} + a_{14}^{(1)}b_{41}^{(0)} \quad (3.2)$$

Cell $21_{44}$:
$$a_{11}^{(0)}b_{11}^{(0)} + a_{12}^{(0)}b_{21}^{(0)} + a_{13}^{(0)}b_{31}^{(0)} + a_{14}^{(0)}b_{41}^{(0)} \quad (3.3)$$

In each multiplication and subsequent summation performed by a cell 21, a carry bit is generated. Each carry bit remains for one cycle on the same respective cell site, being effectively recirculated for addition to the product to be evaluated on the subsequent processing cycle by that cell. The expressions (3.1) to (3.3) are accordingly one bit wide, any carry generated during each summation having been left behind. This is valid because each row of cells 21 in the array evaluates progressively higher order bits on successive processing cycles; i.e. cells 21 evaluating the nth bit $c_{11}^{(n)}$ will evaluate the (n+1)th bit on the next cycle as the interaction region 26 moves down the array 20. Inspection of FIGS. 2 to 4 shows that each horizontal row of cells within the part diamond shaped interaction regions 26 contains all the bit-level partial product terms appropriate to a respective bit of $c_{11}$, carry bits from the preceding processing cycle occupying cells 21 containing two zeros.

On the processing cycle following that shown in FIG. 4, as has been said cell $21_{44}$ outputs the products in Expression (3.3) to accumulating means (to be described later) to give the lsb of $c_{11}$, $c_{11}^{(0)}$. One cycle later, terms forming the second lsb $c_{11}^{(1)}$ emerge from cells $21_{43}$ (Expression 3.1), $21_{44}$ (carry bit) and $21_{45}$ (Expression 3.2) for accumulation. On the subsequent cycle, the third lsb $c_{11}^{(2)}$ is summed analogously from cells $21_{42}$ to $21_{46}$ inclusive. Extending this, it will be appreciated that in general the nth bit $c_{11}^{(n)}$ will be derived by summing 1, 3, 5, 5, 3, or 1 cell outputs as n goes from 1 to 6, and is output bit serially lsb leading.

Figure 5:
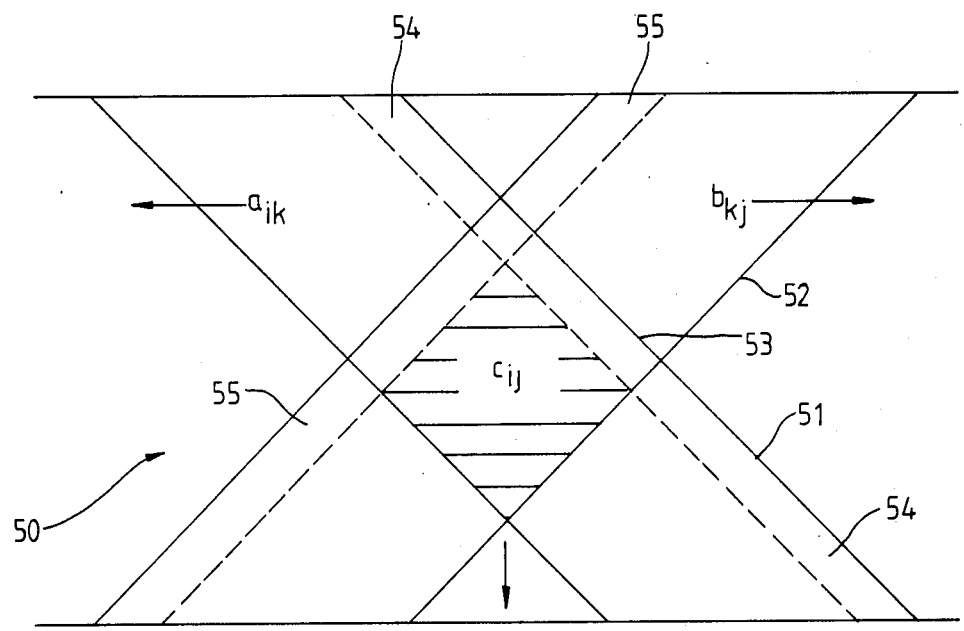
FIGS. 5 and 6 are schematic drawings of single and multiple data interaction regions.

In the example discussed with reference to FIGS. 2 to 4, it has been assumed for convenience that two three-bit numbers $a_{ik}$ and $b_{kj}$ will produce $c_{ij}$ no greater than six bits. This assumption reduces the size of the array to a scale which is convenient for illustrating the operation of the invention. However, some values of $c_{ij}$ might have more than six bits, and provision for this is made as follows. Referring to FIG. 5, a generalised array 50 contains counter-propagating input data parallelograms 51 and 52. The parallelograms 51 and 52 accommodate individual words $a_{ik}$ and $b_{kj}$ defining an interaction region 53 containing the product $c_{ij}$ as previously defined by Equation (1). The elements $a_{ik}$ and $b_{kj}$ are of arbitrary but equal word length. Since $c_{ij}$ is the sum of individual products of the form $a_{ik}b_{kj}$, it will have $2m + \log_2 n$ bits; here m is the number of bits in $a_{ik}$ and $b_{ik}$, and n is the matrix size equal to the maximum value of k or the maximum number of word level products $a_{ik}b_{kj}$ to be accumulated. The maximum word length of each value of $c_{ij}$ must be accommodated vertically within the diamond 53. For this purpose, the input word lengths of $a_{ik}$ and $b_{kj}$ are each increased by a number of zeros equal to $\frac{1}{2}\log_2 n$ added to the most significant or rearward end of the relevant word. The added zeros are also interspersed with zeros as with the original bits of $a_{ik}$ and $b_{kj}$. This is effected by data input means (not shown) before each input word enters the array, and is equivalent to spacing the input parallelograms 51 and 52 by "guard bands" 54 and 55 to accommodate word growth, i.e. carry bits of $c_{ij}$ propagating vertically up the interaction region 53. Non-integral values of $\frac{1}{2}\log_2 n$ are rounded up to an integer for both $a_{ik}$ and $b_{kj}$.

Figure 6:
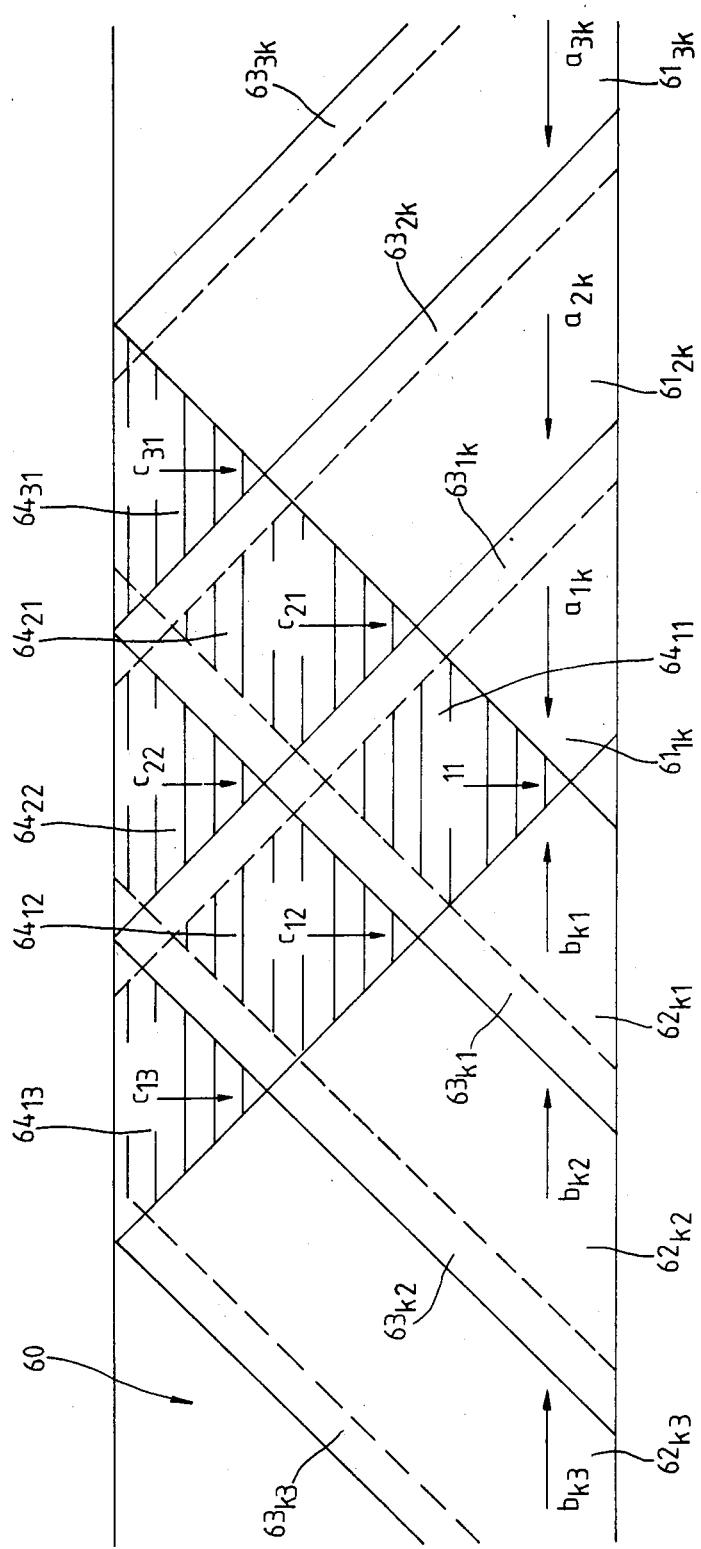

Referring now to FIG. 6, there is shown a generalised array 60 containing leftward leaning parallelograms $61_{ik}$ for elements $a_{ik}$ and rightward leaning parallelograms $62_{kj}$ for elements $b_{kj}$. FIG. 6 represents two matrices A and B in the process of interaction to form a matrix C. Elements of A and B have respective guard bands 63. Wholly and partially diamond-shaped regions $64_{ij}$ accommodate product matrix elements $c_{ij}$. At the instant of time represented by FIG. 6, element $b_{k1}$ is in the process of interacting with elements $a_{1k}$, $a_{2k}$ and $a_{3k}$ to form $c_{11}$, $c_{21}$ and $c_{31}$; $b_{k2}$ is forming $c_{12}$ and $c_{22}$ with $a_{1k}$ and $a_{2k}$, and $b_{k3}$ is forming $c_{13}$ with $a_{1k}$. One cycle later, the A and B parallelograms would each have moved on one cell onwards through the array and the $c_{ij}$ diamonds one cell downwards. Each element $c_{ij}$ vertically accumulates bit-level inner products as it passes through the array 60, and eventually emerges below the array for accumulation. It can be seen that bit-level interaction regions $c_{ij}$ corresponding to interaction regions 26 in FIGS. 2 to 4 collectively form a word-level interaction region $15_C$ in FIG. 1.

Figure 7:
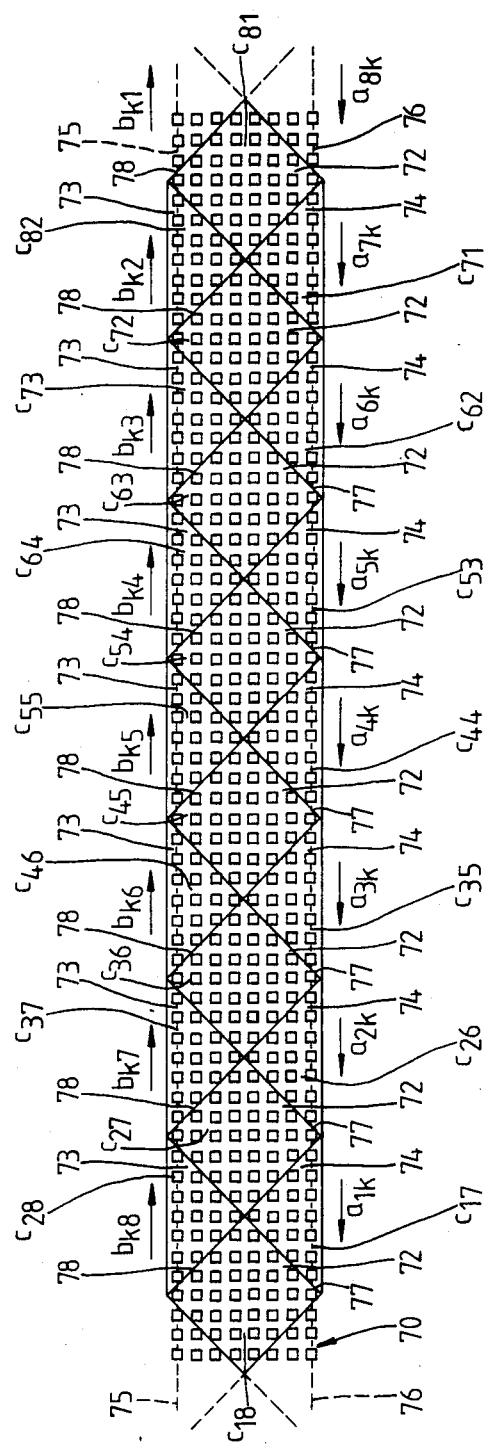
FIG. 7 is a schematic drawing of an array for a processor of the invention.

Referring now to FIG. 7, there is schematically shown a complete systolic array 70 of processing cells indicated by squares 71 equivalent to cells 21 in FIGS. 2 to 4, cell interconnections not being shown. The array 70 is designed for the multiplication of two 8×8 matrices A and B having elements $a_{ik}$ and $b_{kj}$ each two bits wide. It is convenient to treat the case of two bit word lengths, because this gives FIG. 7 a comparatively reasonable size consistent with illustrating necessary features. As will be described later, extension to larger word sizes and bigger matrices is conceptually straightforward.

The minimum size of the array 70 arises as follows. Words must be input with a length $(m+\frac{1}{2}\log_2 n)$, where $m=2$ for two bit words and $n=8$, the size of the matrix. The matrix words $a_{ij}$ and $b_{ij}$ must each be input with a length of $2+\frac{1}{2}\log_2 8=3\frac{1}{2}$, rounded up to 4 bits. This gives $c_{ij}$ equal to a maximum of $4+4$ or 8 bits wide. The width of the array 71 is determined by the criterion that it must accommodate at least a full row of one input matrix overlapping a full column of the other. This ensures that all row elements of one matrix meet all column elements of the other within the array 70. Since the matrices have eight rows and columns, and each element has $m+\frac{1}{2}\log_2 8$ bits (including guard bands), or 4 bits when rounded up, interspersed with zeros, the minimum width of the array 70 is $8\times 4\times 2$ or 64 cells 71. The height of the array 70 is 8 cells 71, since the array must accommodate the eight columns of matrix A superimposed on the eight rows of matrix B. This gives a minimum array size of $64\times 8$ or 512 cells in this example.

The array 70 contains eight complete diamond shaped interaction regions 72, together with seven upper and lower part diamond interaction regions 73 and 74 respectively. The regions 73 and 74 terminate above and below at the top and bottom rows 75 and 76 of the array 70. The interaction regions 73 and 74 are formed by the parallelograms 77 and 78. The parallelograms 77 and 78 mutually counter-propagate to the right and left in the array 70 as described with respect to FIGS. 2 to 4, and the regions 72 to 74 accordingly move down the array. It can be seen that the array 70:

(1) is evaluating $c_{18} \ldots c_{i(9-i)} \ldots c_{81}$ in regions 72, where $i=1$ to 8;

(2) has partly completed evaluating $c_{17} \ldots c_{i(8-i)} \ldots c_{71}$ in regions 74, where $i=1$ to 7; and (3) has begun evaluating $c_{28} \ldots c_{i(10-i)} \ldots c_{82}$ in regions 73, where $i=2$ to 8.

Furthermore, by analogy with the word-level arrays 10 and 60 shown in FIGS. 1 and 6, it will be appreciated that, (4) the terms $c_{ij}$, where $(i+j)=11$ to 16, have yet to be evaluated, and can be considered as being "above" the array 70, the corresponding data parallelograms having yet to cross one another; and (5) the terms $c_{ij}$, where $(i+j)=2$ to 7, have passed through the array 70 for summing by accumulating means (not shown), and can be considered as being "below" the array, the corresponding data parallelograms having crossed.

As has been mentioned regarding the FIG. 1 word-level array 10, interaction regions other than 72 to 74, i.e. lying outside the array 70, do not have physical significance but assist analysis of array operation.

As further example of array dimensions required for multiplying two matrices, $16\times 16$ matrices of 8 bit words would require an array of $320\times 16$ cells. Array could be implemented as individual VLSI chips, or by employing a number of linked chips.

Whereas the operation of the array 70 of the invention has been discussed in relation to the multiplication of $n\times n$ or square matrices, it may also be employed to multiply rectangular matrices, such as multiplication of an $m\times p$ matrix A by a $p\times n$ matrix B. The array 70 would then be p rows high, and would have a minimum length in number of cells equal to the product of the word length of A or B elements with whichever was the larger of m and n.

Figure 8:
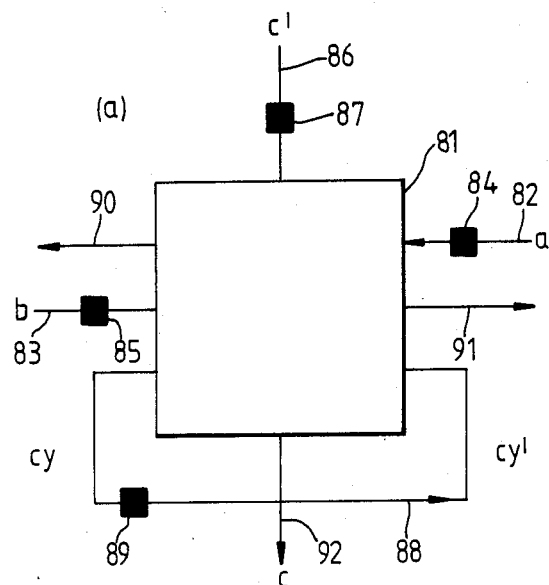
FIGS. 8 and 9 illustrate processing cell functions.

Referring now to FIG. 8, and individual cell 81 corresponding to cell 21 of the array 20 (FIGS. 2 to 4) and cell 71 of the array 70 (FIG. 7) is shown together with interconnections to other cells (not shown). The cell 81 is appropriate for multiplying together positive bit-level numbers. It is a gated full adder having lateral input lines 82 and 83 for accepting A and B matrix data bits a and b progressing to the left and to the right respectively. The input lines 82 and 83 contain respective data bit latches 84 and 85. The cell has a further vertical input line 86 containing a latch 87 and a carry recirculation line 88 containing a latch 89. Lateral output lines 90 and 91 are provided for passing on a and b data bits to the left and right respectively, and a vertical output line 92 for the cell computation output.

The cell 81 has four nearest neighbour cells (not shown) above, below and to the left and right, as indicated in FIGS. 2 to 4 and 7 (apart from cells on the edges of the arrays 20 and 70), and operates as follows. Input data bits a and b occupying latches 84 and 85 are clocked into the cell 81 on a processing cycle, the data bits having been obtained from lateral nearest neighbour cells to the right and left respectively. The cell 81 also receives a cumulative product bit $c'$ from the latch 87, $c'$ having been computed by the nearest neighbour cell vertically above on the preceding cycle. The cell 81 computes the product of a and b and adds to the results $c'$ plus the carry bit $cy'$ obtained on the preceding cycle. This generates a cumulative output product c for output via line 92 to the nearest neighbour cell vertically below, together with a new carry bit cy. The gated full adder logic functions which achieve this are as follows:

$$c = c' \oplus (a \cdot b) \oplus cy' \qquad (4.1)$$

$$cy = [(a \cdot b) \cdot c'] + [(a \cdot b) \cdot cy'] + [c' \cdot cy'] \qquad (4.2)$$

After the above computation, output data bits a and b pass out laterally to the left and right respectively for storage on latches equivalent to 84 and 85 in input lines to lateral nearest neighbours. Similarly, c passes out to a latch equivalent to 87 associated with the cell immediately below. New data bits a, b and $c'$ are then clocked in from latches 84, 85 and 87 and the cycle repeats. Clocking means to achieve this are well known and will not be described.

As regards cells on the edges of the arrays 20 and 70 not wholly surrounded by nearest neighbours, data input means (not shown) supplies data bits from the left and right. Lateral output data lines 90 and 91 on the left and right array edges are unconnected, the output bits "falling out" of the array. The input lines 86 on the upper array edge are initialised to zero, and the output lines 92 on the lower array edge are connected to accumulating means (not shown) to be described later.

Figure 9:
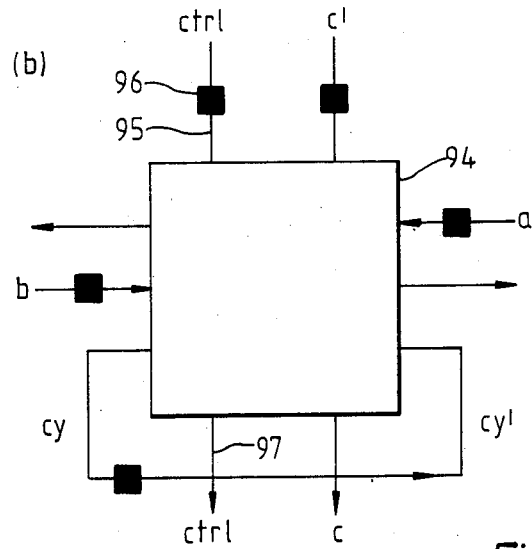

Referring now to FIG. 9, there is shown an alternative form of cell 94 appropriate for processing twos complement numbers. The cell 94 is equivalent to cell 81 of FIG. 8 with the addition of a vertical input control line 95 incorporating a latch 96 together with a vertical output control line 97.

The cell 94 modifies the array (20 or 70) to handle twos complement words in accordance with the Baugh Woolley algorithm, IEEE Trans. on Computers, Vol C-22, No 12, Dec 1973 pp 1045–1047. The multiplication of two twos complement words may be transformed into all positive partial products, provided that all negatively weighted partial products (those involving multiplication of a sign bit by a non-sign bit) are complemented and a fixed correction term is added to the final answer. If the numbers to be multiplied are m bits wide, the correction term has the value $2^m - 2^{2m-1}$. A detailed analysis based on FIGS. 2 to 7 would indicate that the partial products to be complemented are those falling on the upper left and right boundaries—but not the apex—of the diamond shaped interaction regions when present in the array. It will be appreciated that these products must be complemented as they move in the array. In FIGS. 2 and 3 the upper left and right boundaries have yet to enter the array 20, and have only begun to enter in FIG. 4. They are however present in regions 72 and 74 in FIG. 7. The partial products to be complemented are identified by means of the control function of the cell 94. An additional control bit is latched at 96 for input to the cell 94, the control bit being set to 1 when the complement of the partial product a·b is to be added to the cumulative input sum c′ to form the cell output c. The control bit is latched from cell to cell vertically down the array 20 or 70 in synchronism with the propagation of the edges of interaction regions, and is used to indicate cells at which complementing is required.

The logic function of the cell 94 is as follows, where ctrl indicates the control bit and other terms are as previously defined:

$$c = [c' \oplus \{ctrl \oplus (a \cdot b)\} \oplus cy'] \quad (5.1)$$

$$cy = [\{ctrl \oplus (a \cdot b)\} \cdot c'] + [\{ctrl \oplus a \cdot b)\} \cdot cy'] + [c' \cdot cy']. \quad (5.2)$$

As has been mentioned, the final results of the array computations are required to be corrected for the presence of unwanted sign/non-sign cross-product terms. If the resultant value $c_{ij}$ in Equation (2) emergent from the array 20 is the result of n additions of bit-level multiplications, the correction term is $n \times (2^m - 2^{2m-1})$ for m-bit words. Correction may be achieved quite simply either by initialising the cumulative product inputs of top row processing cells, or by adding corrections to the outputs of the accumulating means.

One form of handling twos complement numbers has been described in detail in published United Kingdom Patent Application No. GB 2,106,287A, and a second form is expected to be published shortly in the IEEE Trans. Circuits and Systems. In view of this a detailed analysis will not be given here.

Figure 10:
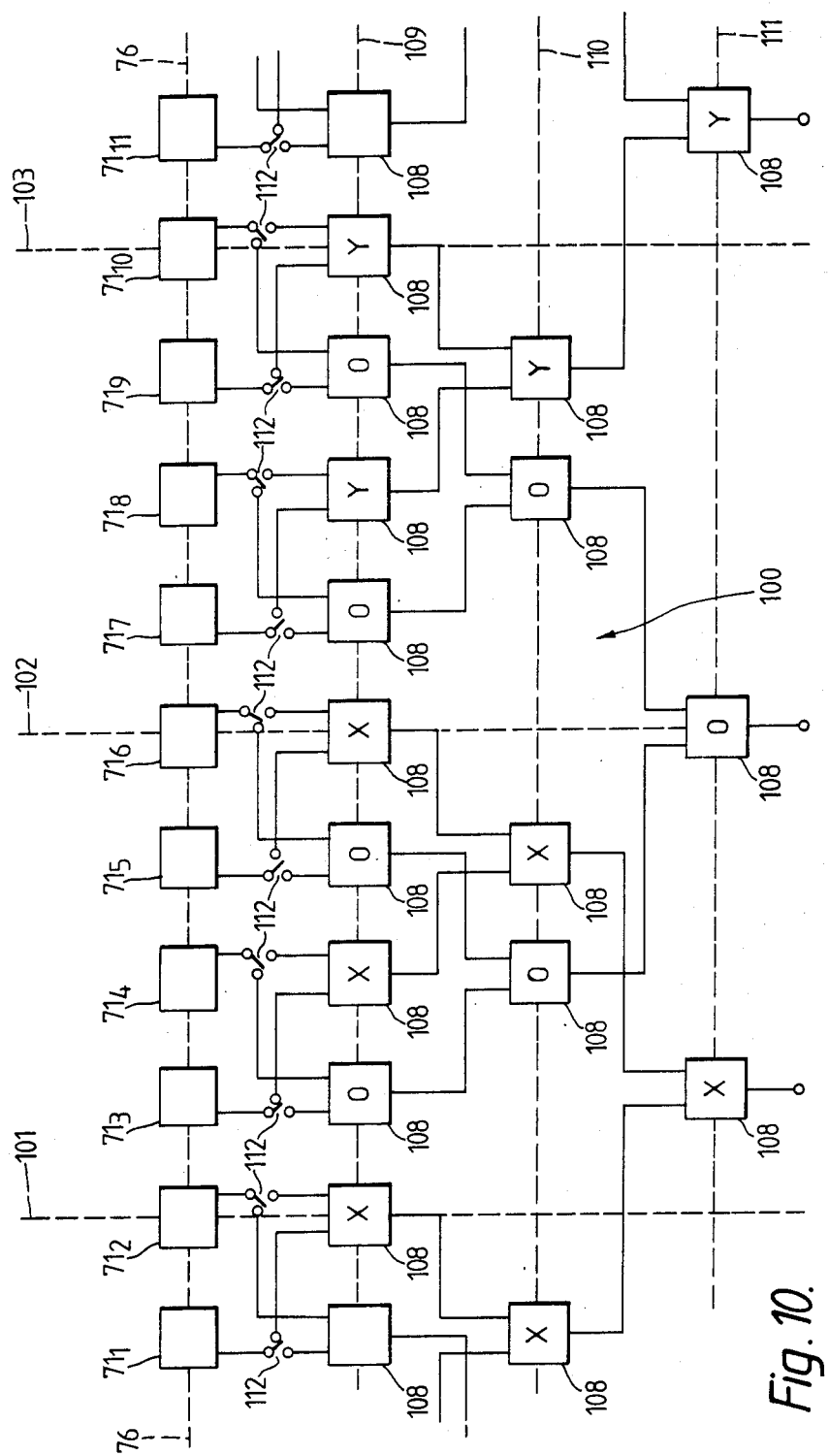
FIG. 10 is a schematic drawing of product matrix accumulating means.

Referring now to FIG. 10, in which parts previously mentioned are like referenced, there is shown an accumulating means or accumulator 100 for summing the outputs of the FIG. 7 array 70 to calculate product matrix elements $c_{ij}$. Eleven cells $71_1$ to $71_{11}$ of the bottom row 76 of the array 70 are shown, and the positions of the edges or lateral apices of interaction regions of FIG. 7 are indicated by vertical chain lines 101, 102 and 103 passing through the middle of every fourth cell $71_2$, $71_6$ and $71_{10}$ respectively. As will be described, interaction regions encompass up to seven cells lying wholly between pairs of alternate vertical lines such as 101 and 103, but not the adjacent cells on those lines.

Below the row of cells 71 are located mutually intercalated full adder trees of which three are indicated by the character O, X or Y within each adder 108. Each tree comprises adders 108 arranged in upper, middle and lower ranks indicated by chain lines 109 to 111. Each upper rank adder 108 is arranged to sum the outputs of two cells 71, and each middle or lower rank adder sums the outputs of two upper or middle rank adders respectively.

Figure 11:
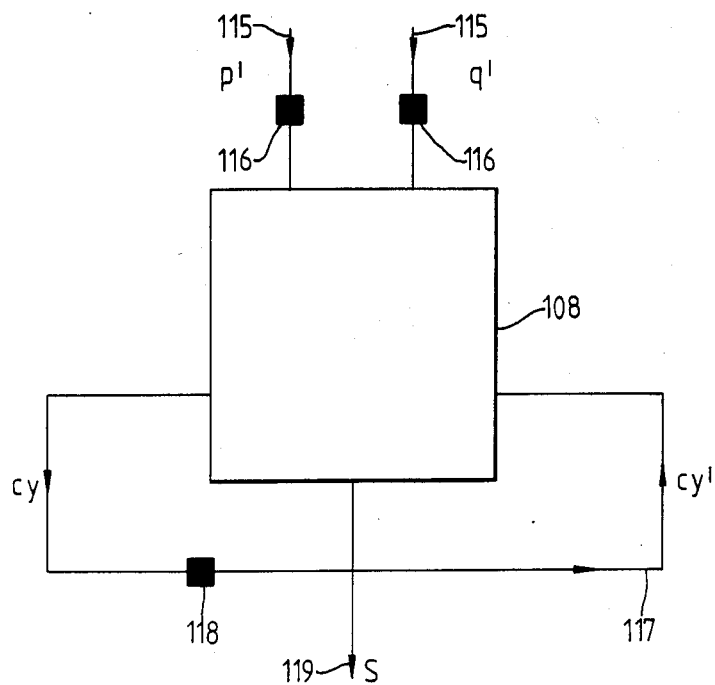
FIG. 11 is a drawing of an adder cell for the accumulating means of FIG. 10.

Referring now also to FIG. 11, in which like parts are like referenced, each adder 108 is a full adder as illustrated. It has two input lines 115 incorporating respective latches 116, a carry recirculation line 117 including a latch 118 and an output line 119. Operation of the adder 108 and latches 116 and 118 is under the control of clocking means controlling the array of processing cells 71. The adder 108 receives two input data bits p′ and q′ from two cells 71 or two adders 108 (not shown) immediately above, adds the data bits to a carry bit cy′ from an earlier computation, and produces a sum bit s and a new carry bit cy. The sum bit s is passed on to the adder or output immediately below (not shown). The full adder logic function is given by:

$$s \leftarrow p' \oplus q' \oplus cy' \quad (6.1)$$

$$cy + (p' \cdot q') + (p' \cdot cy') + (q' \cdot cy'). \quad (6.2)$$

The output of each of the cells $71_3$ to $71_6$ is connected either to adder tree O or to adder tree X in accordance with the position of a respective cell output switch 112. Similarly, cells $71_7$ to $71_{10}$ may be connected to adder tree O or Y in accordance with the positions of further switches 112.

The arrangement of FIGS. 10 and 11 operate as follows, reference to FIG. 7 being made also. Consider the diamond shaped interaction regions 72 moving down the array 70. As illustrated, each region 72 encompasses one cell 71 in the bottom row 76 having its output summed by the accumulator 100. On the next seven cycles, it will encompass three, five, seven, seven, five, three and one bottom row cells 71 in succession before "passing out" of the array 70 (cf movement of regions 26 in FIGS. 2 and 4). The partial interaction regions 74 each encompass (as illustrated) seven bottom row cells 71 having summed outputs, and will pass out of the array 70 after three further cycles when each region 72 will encompass seven bottom row cells and each region 73 one. Inspection of FIGS. 7 and 10 shows that the output of each bottom row cell 71 must switch from one adder tree (O, X or Y) to another when the upper or lower diagonal boundary of an interaction region such as 72 to 74 has passed over it.

The separation between adjacent pairs of vertical chain lines (e.g. 101–102 or 102–103) corresponds to halfwidths of diamond interaction regions 72 to 74. The switching of each cell 71 between two respective adder trees varies in accordance with the respective cell position along the bottom row 76. Cell $71_3$ for example occupies the left hand side of an interaction region for two cycles and then switches to occupy the right hand side of a successive interaction region for six cycles. The corresponding numbers of cycles for cells $71_4$ and $71_5$ are four and four, and six and two respectively. Cell $71_6$ however remains in each successive interaction region for eight cycles, since it occupies the middle of each region. The interaction region occupation scheme of cells $71_3$ to $71_6$ applies to each subset of four cells, i.e. $71_7$ to $71_{10}$ and so on.

When located in the *left* hand half of any interaction region, any of cells $71_3$ to $71_5$ would be switched to adder tree O. However, any one of cells $71_7$ to $71_9$ would be switched to adder tree O when located in the *right* hand half of any interaction region. When changing from occupying one half of an interaction region to the opposite half of a succeeding region, each of the cells $71_3$ to $71_9$ would switch from one respective adder tree to the other. The fourth cells $71_6$ and $71_{10}$ remain switched to adder trees O and Y respectively throughout. Pairs of cells $71_{12-n}$ and $71_n$ (n=3, 4 or 5) switch in synchronism.

Cells $71_3$ to $71_9$ represent a section of the bottom row 76 of the array 70 vertically below the seven-cell maximum width of any one of the interaction regions 72. On the processing cycle illustrated in FIG. 7, adder tree O would be summing the output of cell $71_6$, cells $71_3$ to $71_5$ would be switched to adder tree X and cells $71_7$ to $71_9$ to adder tree Y with cell $71_{10}$. One cycle later, the region 74 would move down to encompass the three cells $71_5$ to $71_7$, which would accordingly be connected to adder tree O. Adder trees X and Y would each be connected to five respective cells to the left and right of cells $71_5$ to $71_7$. Table 1 shows the cells 71 switched to adder tree O for eight successive cycles beginning with cycle 1 shown in FIG. 7.

TABLE 1

| Cycle Number | Cells Connected to Adder Tree O | No of Outputs Summed |
|---|---|---|
| 1 | $71_6$ | 1 |
| 2 | $71_5$ to $71_7$ | 3 |
| 3 | $71_4$ to $71_8$ | 5 |
| 4 | $71_3$ to $71_9$ | 7 |
| 5 | $71_3$ to $71_9$ | 7 |
| 6 | $71_4$ to $71_8$ | 5 |
| 7 | $71_5$ to $71_7$ | 3 |
| 8 | $71_6$ | 1 |

On the subsequent cycle, or cycle 9, the Table 1 sequence begins to repeat for the next interaction region (not shown) vertically above region 72.

The cell outputs summed by adder tree O on each cycle are those required for each successive bit of the product matrix element $c_{ij}$ corresponding to interaction region 72. The bits emerge serially lsb leading from the lower rank adder 108 of adder tree O three processing cycles after leaving the bottom row 76 of cells 71. Three cycles after cycle 8 of Table 1, the eighth bit of $c_{ij}$ emerges from tree O, and consists only of the carry bit recirculated on the respective lower rank adder from cycle 7. This is because the product evaluated by cell $71_6$ on cycle 8 is that of two word-growth zeros. After the final carry bit has emerged, the lower rank adder of tree O has been zeroed for computation of the lsb of the next interaction region (not shown) vertically above region 72, and the Table 1 sequence then repeats.

Figure 12:
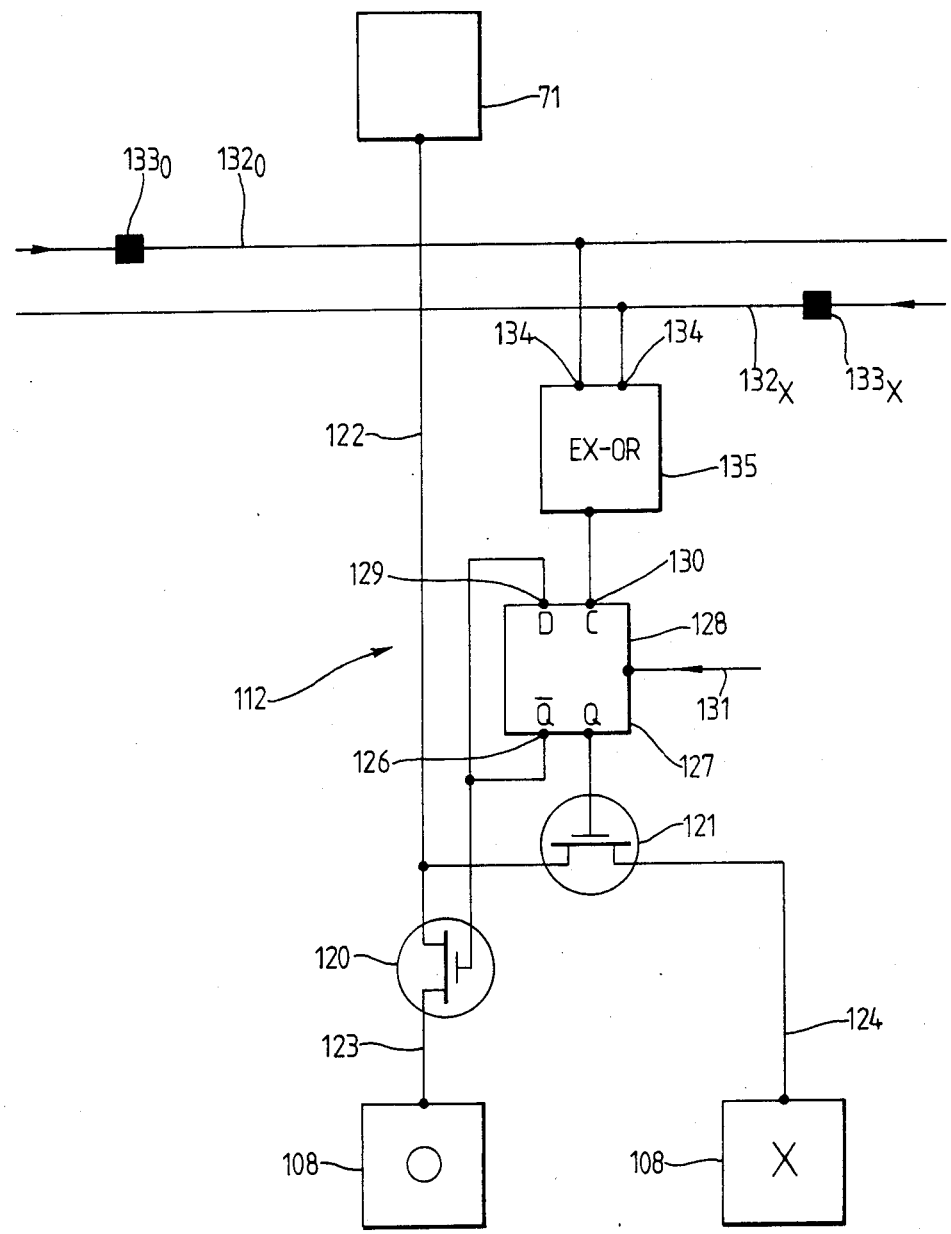
FIG. 12 is a drawing of a circuit for switching between adder trees in the accumulating means of FIG. 10.

Referring now also to FIG. 12, there is shown a circuit for the two-way switches 112 of FIG. 10, parts previously mentioned having like references. Each switch 112 comprises FET transistor switches 120 and 121 for switching the output of cell 71 on line 122 to an adder 108 of tree O or X via line 123 or 124 respectively. The FET switches 120 and 121 are controlled by the $\overline{Q}$ and Q outputs 126 and 127 of a D-type flip-flop having a D or data input 129, a clock input 130 and a reset line 131. The $\overline{Q}$ output 126 is connected to the D input 129. The array 70 is provided with two control lines $132_O$ and $132_X$ having respective latches $133_O$ and $133_X$, these not being shown in FIG. 7. The control lines $132_O$ and $132_X$ are arranged parallel to and immediately below the bottom row 76 of the array 70, and are connected to respective inputs 134 of a respective Exclusive-OR gate 135 for each switch 112.

The circuit of FIG. 12 operates as follows. As has been mentioned with reference to FIGS. 7 and 10, the two-way switches 112 are required to switch the outputs of cells 71 in the bottom row of the array 70 from one adder tree to another when the boundary of an interaction region has moved across it. Such boundaries are also the boundaries of rightward and leftward moving data parallelograms. Switching occurs in synchronism with the input of the first or least significant bit of each bit-serial data word $a_{ik}$ or $b_{kj}$ to a cell 71. To effect switching, each of control lines $132_O$ and $132_X$ carries a pulse train of 1s each followed by seven 0s progressing to the right and left respectively, each 1 pulse being synchronised with the passage of an lsb of a respective rightward or leftward moving data parallelogram through the bottom row 76 of cells 71. The circuit of FIG. 12 is initialised by operation of the reset line 131, which sets the Q output 127 to zero and the $\overline{Q}$ output 126 and D input 129 to one. This switches transistors 120 and 121 on and off respectively, and connects cell 71 to adder tree O. At this initial moment, data parallelograms have yet to interact. As the parallelograms counter-propagate through the array 70, eventually 1 pulses on line $132_O$ and $132_X$ will be clocked into and out of latches $133_O$ and $133_X$. The EX-OR gate 135 provides a 1 output if either (but not both) its inputs are 1, indicating that the boundary of one data parallelogram (only) has crossed bottom row cell 71. This EX-OR output 1 appears on the flip-flop clock input 130, and clocks the initial D input value of 1 to the Q output 126, $\overline{Q}$ and D becoming 0. Transistors 120 and 121 switch to off and on respectively, connecting cell 71 to adder tree X instead of adder tree O as initially. Subsequent control line pulses switch the cell 71 back and forth between adder trees in synchronism with the bottom row lsb of data parallelograms, as required to synchronise adder tree switching with interaction region or product matrix coefficient movement. The EX-OR gate 135 does not switch if both its inputs are 1, since this corresponds to a cell (e.g. $71_6$ or $71_{10}$) positioned in the middle of successive interaction regions which does not switch between adder trees.

From the moment of initialisation referred to above, there are periods during which adder tree outputs are ignored. These periods are the times taken for data parallelograms to move across the array and interact, and for the resulting interaction regions to move out to the lower rank adders 108. The relevant time will be longer the further the corresponding interaction region is from the middle of the array 70. Provision for ignoring results during such settling periods is well understood in the art.

Figure 13:
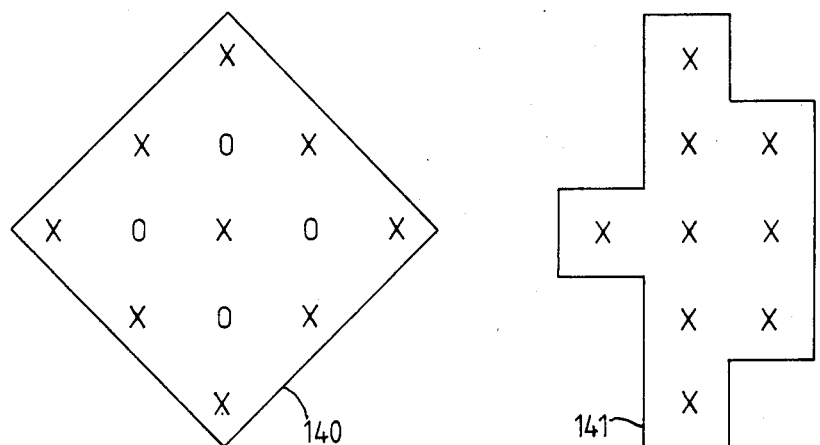
FIG. 13 is a drawing of two product matrix interaction regions.

The foregoing description of the invention has dealt with data input with bits interspersed with zeros. While both functional and convenient for explanatory purposes, it incorporates 50% cell redundancy in that half the processing cells at any time are evaluating products involving interspersed zeros. This redundancy is capable of reduction. Referring now to FIG. 13, there are shown two interaction regions 140 and 141. Region 140 is five cells wide, diamond shaped and equivalent to interaction regions described previously, and includes data bits interspersed with zeros indicated by Xs and Os respectively. Region 141 is a form of region 140 which has been contracted such that data bits X move to the right sufficiently to remove interspersed zeros. This results in three columns of one, five and three data bits X in the region 141 without interspersed zeros.

Figure 14:
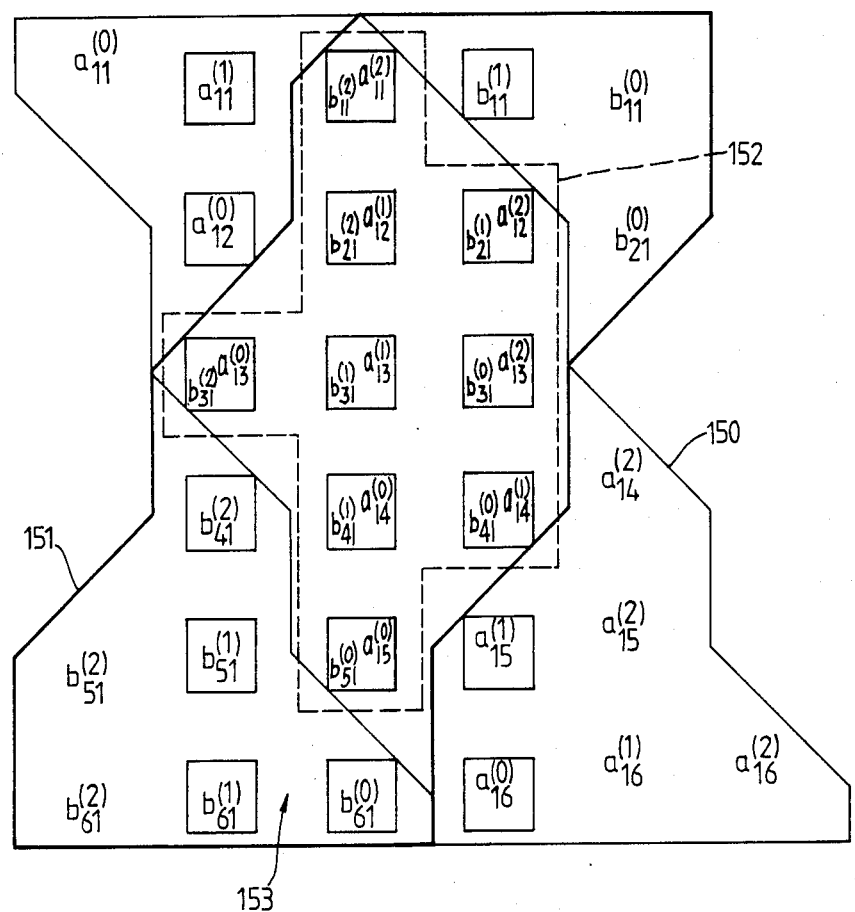
FIG. 14 is a drawing of a contracted product matrix interaction region within an array.

Referring now to FIG. 14, there are shown A and B matrix data regions 150 (narrow lines) and 151 (broad lines) interacting to form a C product matrix region 152 (chain lines) in a part 153 of a larger array (not shown), where A and B are 6×6 matrices of elements three bits wide. FIG. 14 is similar to FIGS. 2 to 4 but with regions 150 and 152 contracted. The consequences of contraction or removal of interspersed zeros is indicated by the multilateral shapes of regions 150 to 152. As shown, and with terms as previously defined, bit-level matrix elements $a_{1k}^{(n)}$ and $b_{k1}^{(n)}$ are in the process of interacting to form product matrix element $c_{11}$ (cf FIGS. 2 to 4). To compensate for the lack of interspersed zeros, the movement of rows of regions 150 and 151 becomes more complex than that described for earlier examples. The movement is as follows. On odd numbered array processing cycles, elements $a_{1k}^{(n)}$ in odd numbered rows of region 150 (i.e. k=1, 3 and 5) move one cell to the left, and elements $b_{k1}^{(n)}$ in even numbered rows (k=2, 4 and 6) move one cell to the right. All other matrix elements stay fixed. On even numbered cycles elements $a_{kf}^{(n)}$ for which k=2, 4 and 6 move one cell to the left and elements $b_{kf}^{(n)}$ for which k=1, 3 and 5 move one cell to the right. The analysis of this movement is similar to that given for FIGS. 2 to 4, 7 and 10, and shows that product matrix terms are accumulated in the appropriate manner. The analysis also extends naturally to a full array (cf FIGS. 6 and 7), since interaction regions equivalent to region 152 nest together in a manner similar to diamond-shaped regions. The effect is that the number of processing cells in an array is reduced by half, with a corresponding reduction in the number of adders required in the accumulating means. This effect is achieved as has been described by data input means arranged to move alternate rows of one input matrix while columns of the other input matrix interacting therewith remain stationary, and to keep stationary the remaining rows of that input matrix while alternate columns of the other matrix move. This procedure is repeated on alternate array cycles such that each row or column of a respective input matrix experiences alternate movement and stationary cycles in anti-phase with the two respective adjacent matrix rows or colums. Clocking means for achieving this are well known in the art. To effect alternating movement of data bits, each individual processing cell 81 or 94 (FIG. 8 or 9) is controlled in a slightly different manner. Latches 84 and 85 for a and b data bits respectively are clocked on alternate cycles, whereas vertical input latch 87, carry latch 89 and control latch 96 are clocked every cycle.

A form of time stagger is applied to data input to the array incorporating the part 153, the stagger being more complex than that described with reference to FIGS. 2 to 4. Matrix elements in alternate rows are time delayed by one cycle or cell as compared to that the rows above. As matrix elements of A in each odd-numbered row move under the action of clocking means, they establish a one-cell time stagger over the respective adjacent elements immediately below, and this stagger is removed on the next cycle when matrix elements of A in even numbered rows move. The equivalent takes place in antiphase for matrix elements of B. This may be achieved by providing for matrix element input via one latch in series with the third and fourth rows and two latches in series with the fifth and sixth rows. Larger arrays would be provided with series input latches increasing by one every second row.

We claim:

1. A digital data processor for multiplying row elements of a first input matrix by column elements of a second input matrix to form a product matrix, the processor including:

a systolic array of processing cells arranged for bit-level multiplication;

data input means for effecting bit-level matrix element input to the array for multiplication of each bit of each first matrix row element by each bit of each of the second matrix elements in a respective column; wherein the data input means is arranged both for matrix input with zeros interspersed between adjacent bits of each matrix element and for producing a cumulative time stagger between input of adjacent rows of the first matrix and adjacent columns of the second matrix, accumulating means for summing array output contributions to each bit of each product matrix element; and clocking means for controlling operation of the processing cells, data input means and accumulating means, the clocking means being arranged to advance both input matrices by one cell through the array on each clock cycle, wherein the processing cells are nearest-neighbour connected and have processing functions to evaluate the product of two input data bits, add the product to an input cumulative sum bit and a carry bit from a next lower order bit computation, output a corresponding result, generate a new carry bit and pass on the input data bits to respective neighbouring cells.

2. A digital data processor according to claim 1 wherein the data input means is arranged both for matrix input without zeros interspersed between adjacent matrix element bits and for producing a cumulative time stagger between input of alternate rows of the first matrix and alternate columns of the second matrix, and wherein the clocking means is arranged for advancing on alternate clock cycles both adjacent rows of the first matrix and adjacent columns of the second matrix such that advanced input matrix elements are multiplied by non-advanced matrix elements on each cycle.

3. A digital data processor for multiplying row elements of a first input matrix by column elements of a second input matrix to form a product matrix, the processor including:

a systolic array of processing cells arranged for bit-level multiplication;

data input means arranged to effect bit-level matrix element input to the array for multiplication of each bit each first matrix row element by each bit of each of the second matrix elements in a respective column;

accumulating means arranged to sum array output contributions to each bit of each product matrix element;

the accumulating means including pairs of mutually intercalated adder trees arranged to sum array output contributions to each bit of each product matrix element; and clocking means to control operation of the processing cells, data input means and accumulating means.

4. A digital data processor according to claim 3 including switching means arranged to switch individual array outputs from one respective adder tree to another.

5. A digital data processor according to claim 4 including control means arranged to actuate the switching means in conjunction with entry of a leading bit of a matrix element into an array output cell.

6. A digital data processor according to claim 5 wherein the control means includes two control lines each containing a respective latch associated with each array output cell, means for generating control pulses for propagation along the control lines in synchronism with array throughput of leading matrix element bits, and subsidiary switching means for switching individual array outputs from one respective adder tree to another in response to actuation by control pulses.

7. A digital data processor for multiplying row elements of a first input matrix by column elements of a second input matrix to form product matrix elements, each matrix element being a digital word, comprising:
an array of bit-level logic cells arranged in rows and columns, wherein each logic cell is arranged to:
 (a) input two matrix element bits together with carry and cumulative sum bits,
 (b) compute output cumulative sum and carry bits corresponding to addition of the input cumulative sum and carry bits to the product of the input matrix element bits,
 (c) output both matrix element bits and the output cumulative sum bit, and
 (d) recirculate the output carry bit on the respective cell to provide an input carry bit to a succeeding computation;
nearest neighbour cell interconnection means for allowing matrix element bit movement along array rows and for allowing cumulative sum generation to be cascaded down array columns, the interconnection means including clock-activated latch means for bit storage and advance;
wherein each row of the array is arranged to receive a respective first matrix row of elements and a respective second matrix column of elements input to mutually opposite row ends and disposed both bit and word serially with least significant bits leading;
wherein the latch means are also for clock activation both to advance first matrix row elements and second matrix column elements in counterflow along array rows and to cascade cumulative sum generation down array columns; and
wherein the array columns have final logic cells, each having a cumulative sum output for association with those of respective nearby cells,
and further comprising a plurality of switching means for switching said cumulative sum outputs; and
first and second accumulating means, arranged to add the respective cumulative sum output to those of nearby final cells of other columns at least predominantly to one side of one of said cells as selected by each switching means, each switching means being arranged to alternate cell output summing between the first and second accumulating means as appropriate to isolate and sum contributions to different product matrix elements.

8. A digital data processor according to claim 7 wherein each of the first and second accumulating means comprises an adder tree, and each switching means includes control means arranged to actuate switching in synchronism with an input of a leading bit of a matrix element to the respective array column final cell associated therewith.

9. A digital data processor according to claim 8 where the control means includes two control lines, each containing a respective latch associated with each array column final cell, the control lines being arranged for propagation of control pulses in synchronism with array throughput of leading matrix element bits, and wherein each switching means is arranged to operate in response to receipt of each of the said control pulses.

* * * * *